United States Patent
Watari et al.

(10) Patent No.: US 12,330,656 B1
(45) Date of Patent: Jun. 17, 2025

(54) TRAVEL CONTROL DEVICE AND TRAVEL CONTROL METHOD

(71) Applicant: TOYOTA JIDOSHA KABUSHIKI KAISHA, Toyota (JP)

(72) Inventors: Yuji Watari, Toyota (JP); Ryo Irie, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/969,714

(22) Filed: Dec. 5, 2024

(30) Foreign Application Priority Data

Feb. 28, 2024 (JP) ................. 2024-028435

(51) Int. Cl.
*B60W 30/182* (2020.01)
*B60W 50/00* (2006.01)
*B60W 50/02* (2012.01)

(52) U.S. Cl.
CPC ...... *B60W 30/182* (2013.01); *B60W 50/0205* (2013.01); *B60W 2050/0095* (2013.01)

(58) Field of Classification Search
CPC .......... B60W 30/182; B60W 50/0205; B60W 2050/0095; B60W 60/0054
See application file for complete search history.

(56) References Cited

U.S. PATENT DOCUMENTS

| | | | |
|---|---|---|---|
| 9,365,213 B2 * | 6/2016 | Stenneth | ............. B60W 30/182 |
| 10,754,347 B2 | 8/2020 | Kamata | |
| 10,991,176 B2 | 4/2021 | Yoshizaki et al. | |
| 11,001,198 B2 | 5/2021 | Morimura et al. | |
| 11,150,649 B2 | 10/2021 | Sato et al. | |
| 11,267,452 B2 | 3/2022 | Okuda et al. | |
| 11,377,126 B2 * | 7/2022 | Kato | ..................... B60W 50/00 |
| 11,884,305 B2 * | 1/2024 | Ikenori | ..................... B60T 7/12 |
| 12,240,476 B2 * | 3/2025 | Kobayashi | ............. B60K 35/80 |
| 2020/0348682 A1 | 11/2020 | Kamata | |
| 2021/0139050 A1 | 5/2021 | Fujita et al. | |
| 2021/0163039 A1 | 6/2021 | Iwamoto et al. | |
| 2021/0229598 A1 | 7/2021 | Morimura et al. | |
| 2021/0284194 A1 | 9/2021 | Kijima | |

FOREIGN PATENT DOCUMENTS

JP 2019-111866 A 7/2019

* cited by examiner

*Primary Examiner* — Huan Le
(74) *Attorney, Agent, or Firm* — SoraIP, Inc.

(57) ABSTRACT

The travel control device includes an abnormality detection unit that detects an abnormality of the first automated driving control unit and the second automated driving control unit, a first switching unit that switches to the automated driving control of the other of the first automated driving control unit and the second automated driving control unit when one of the first automated driving control unit and the second automated driving control unit during the automated driving control is detected to be abnormal, a permission unit that instructs the end of the automated driving control to the first automated driving control unit and the second automated driving control unit, and a second switching unit that switches between the automated driving control and the manual driving control in response to an instruction from the permission unit.

5 Claims, 4 Drawing Sheets

TRAVEL CONTROL DEVICE AND TRAVEL CONTROL METHOD

CROSS-REFERENCE TO RELATED APPLICATION

This application claims priority to Japanese Patent Application No. 2024-028435 filed on Feb. 28, 2024, incorporated herein by reference in its entirety.

BACKGROUND

1. Technical Field

The present disclosure relates to a technique for performing automated driving control for autonomously driving a vehicle.

2. Description of Related Art

Japanese Unexamined Patent Application Publication No. 2019-111866 (JP 2019-111866 A) discloses an automated driving system that, when an abnormality occurs in one of control systems during automated driving control, continues the automated driving control by the other control system that is operating normally. In this automated driving system, when an abnormality occurs in one of the control systems while the automated driving control is stopped, the automated driving control will not be performed even when the other control system is operating normally.

SUMMARY

In the technique described in JP 2019-111866 A, when an instruction to end the automated driving control is output by mistake during the automated driving control, the driving control is switched to manual driving control. In this technique, even if an abnormality is subsequently detected in one of the control systems and the other control system attempts to perform the automated driving control, the automated driving control cannot be performed.

The present disclosure provides a technique that allows to continue automated driving control when an instruction to end the automated driving control is output by mistake.

A travel control device according to an aspect of the present disclosure includes:
 a first automated driving control unit configured to perform automated driving control for autonomously driving a vehicle;
 a second automated driving control unit configured to perform the automated driving control for autonomously driving the vehicle;
 an abnormality detection unit configured to detect an abnormality of the first automated driving control unit and an abnormality of the second automated driving control unit;
 a first switching unit configured to, when one of the first automated driving control unit and the second automated driving control unit that are performing the automated driving control is detected to be abnormal, switch to the automated driving control of another of the first automated driving control unit and the second automated driving control unit;
 a permission unit configured to instruct the first automated driving control unit and the second automated driving control unit to end the automated driving control; and
 a second switching unit configured to switch between the automated driving control and manual driving control in response to an instruction from the permission unit. When the second switching unit receives an instruction to end the automated driving control from the permission unit, the second switching unit waits to end the automated driving control until a predetermined wait time elapses.

Another aspect of the present disclosure is a travel control method. This method is a travel control method whose steps are performed by a travel control device. The travel control device includes a first automated driving control unit and a second automated driving control unit that are configured to perform automated driving control for autonomously driving a vehicle. The travel control method includes the steps of:
 detecting an abnormality of the first automated driving control unit and an abnormality of the second automated driving control unit;
 when only one of the first automated driving control unit and the second automated driving control unit is detected to be abnormal during the automated driving control, switching to the automated driving control of another of the first automated driving control unit and the second automated driving control unit;
 instructing the first automated driving control unit and the second automated driving control unit to end the automated driving control; and
 when an instruction to end the automated driving control is received, waiting to end the automated driving control until a predetermined wait time elapses.

As described above, the present disclosure provides a technique that allows to continue automated driving control when an instruction to end the automated driving control is output by mistake.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
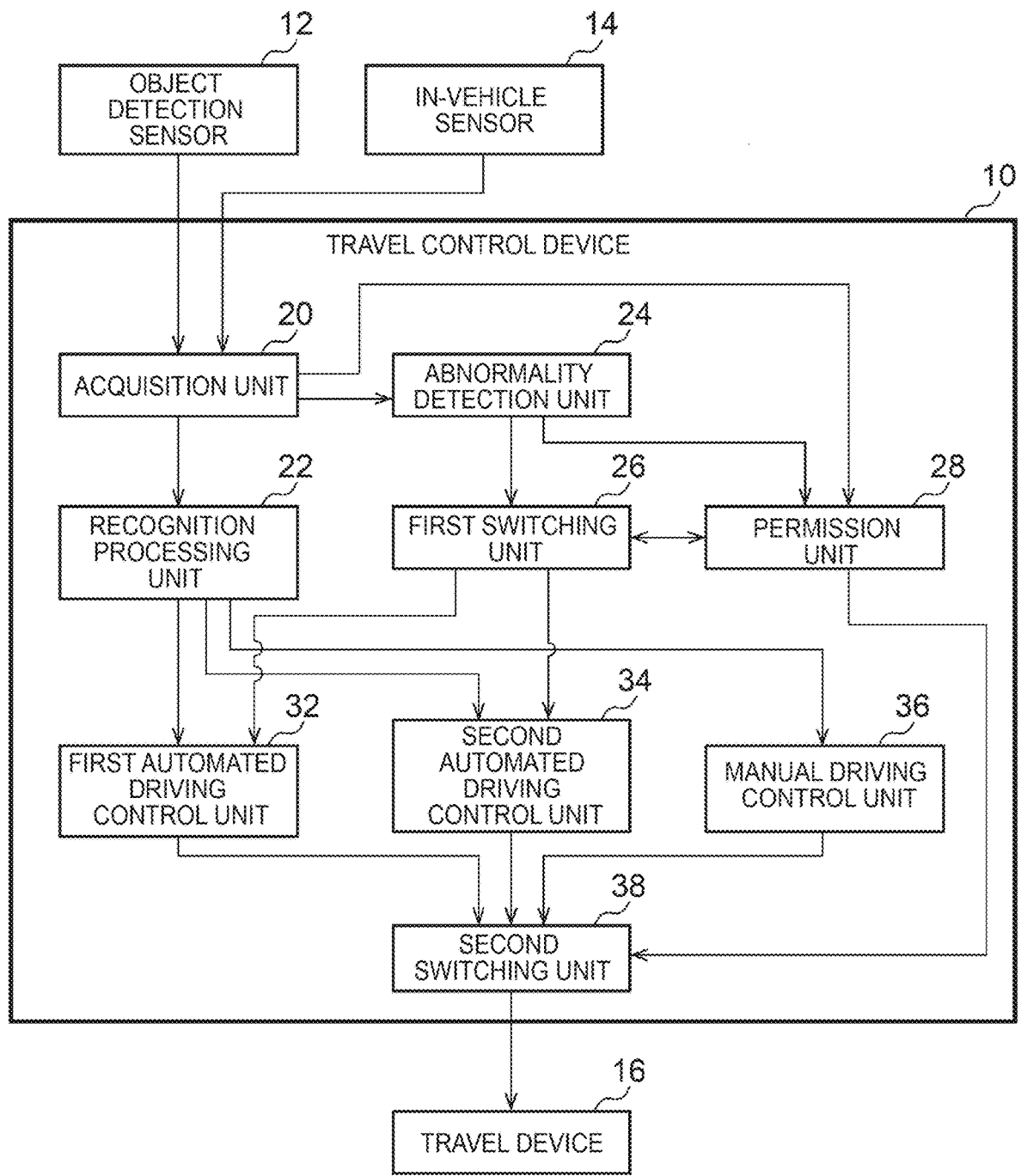
FIG. 1 is a diagram illustrating a functional configuration of a travel control system according to an embodiment.

FIG. 1 is a diagram illustrating a functional configuration of a travel control system 1 according to an embodiment. The travel control system 1 performs automated driving control that allows autonomous traveling. In the automated driving control, the travel control system 1 performs following control for following the preceding vehicle and cruise control for traveling on the travel lane at a predetermined vehicle speed. The travel control system 1 includes a travel control device 10, an object detection sensor 12, an in-vehicle sensor 14, and a travel device 16.

The object detection sensor 12 includes an in-vehicle camera, a millimeter wave radar, an optical radar, a sound wave sensor, and the like, and detects an object located in the vicinity of the vehicle. The object detection sensor 12 may transmit information indicating a positional relationship between the object and the own vehicle to the travel control device 10 as information about the object, or may transmit a simple sensor value to the travel control device 10 as information about the object.

The in-vehicle sensor 14 includes an input unit that receives an operation input from a driver, a traveling state detection sensor that detects a traveling state of the vehicle, and sensors that detect an abnormality of the first automated driving control unit 32 and an abnormality of the second automated driving control unit 34. The input may be at least one of a touch pad, a mechanical switch, and a microphone. The input unit receives on/off of the automated driving control and receives destination information in the automated driving control. The traveling state detection sensor includes a vehicle speed sensor, a steering angle sensor, an acceleration sensor, a brake pressure sensor, and the like, and transmits a result of detecting the traveling state of the vehicle to the travel control device 10.

A sensor that detects abnormality of the first automated driving control unit 32 and the second automated driving control unit 34 detects operating states of the first automated driving control unit 32 and the second automated driving control unit 34, respectively, and transmits a detection result to the travel control device 10. The operating states of the first automated driving control unit 32 and the second automated driving control unit 34 indicate, for example, whether the first automated driving control unit 32 and the second automated driving control unit 34 are operating normally. The sensor is detected to be abnormal when a harness connected to the first automated driving control unit 32 and/or the second automated driving control unit 34 is disconnected.

The travel device 16 includes a driving unit that applies a driving force to the wheels and rotates the wheels to advance the vehicle, a turning unit that steers the wheels, and a braking unit that applies a braking force to the wheels. The drive means may be an engine, a motor, or a combination thereof. The travel device 16 may be driven by an operation of a driver, or may be driven by automated driving control.

The travel control device 10 includes an acquisition unit 20, a recognition processing unit 22, an abnormality detection unit 24, a first switching unit 26, a permission unit 28, a first automated driving control unit 32, a second automated driving control unit 34, a manual driving control unit 36, and a second switching unit 38.

The acquisition unit 20 acquires the detection results of the object detection sensor 12 and the travel state detection sensor, and acquires the operation result of the driver from the input unit. The acquisition unit 20 acquires the detection results of the operating states of the first automated driving control unit 32 and the second automated driving control unit 34.

The recognition processing unit 22 recognizes information about the object, for example, position information of the object, based on the detection result of the object detection sensor 12. The recognition processing unit 22 may identify the object from the captured image by using a neural network technique, for example, a deep learning technique.

The first automated driving control unit 32 and the second automated driving control unit 34 can perform the automated driving control in response to an instruction to start performing the automated driving control from the in-vehicle sensor 14, and can drive the vehicle autonomously. The first automated driving control unit 32 and the second automated driving control unit 34 may be separate microcontrollers and may be connected to different power supply units to operate. The first automated driving control unit 32 and the second automated driving control unit 34 may be provided in one microcontroller.

The first automated driving control unit 32 and the second automated driving control unit 34 generate command values for performing the automated driving control. The command values for performing the automated driving control include a target vehicle speed, a turning angle, a deceleration speed, and the like. The first automated driving control unit 32 and the second automated driving control unit 34 operate in parallel during the automated driving control.

Although the first automated driving control unit 32 and the second automated driving control unit 34 may respectively performs arithmetic processing for automated driving control, arithmetic processing for automated driving control may be performed by a common program. The calculation processing for the automated driving control is processing for calculating the target vehicle speed, the target turning angle, and the target deceleration used in the automated driving control based on the recognition result of the recognition processing unit 22. Since the first automated driving control unit 32 and the second automated driving control unit 34 operate in parallel, even if there is an abnormality on one side, it is easy to immediately shift to the control on the other side.

The manual driving control unit 36 is a control mode in which the vehicle travels by an operation of a driver, and perform driver assistance control such as an automatic braking function and an anti-lock braking system. One of the first automated driving control unit 32, the second automated driving control unit 34, and the manual driving control unit 36 transmits a command value for controlling the travel device 16 to the travel device 16 based on the detection result of the sensor. The travel device 16 causes the vehicle to travel in accordance with the received command value.

The abnormality detection unit 24 detects an abnormality of the first automated driving control unit 32 and the second automated driving control unit 34, that is, detects whether the first automated driving control unit 32 and the second automated driving control unit 34 are unable to operate normally. The abnormality detection unit 24 detects an abnormality of the first automated driving control unit 32 and the second automated driving control unit 34 not only during the automated driving control but also when the in-vehicle power supply is turned on.

The abnormality detection unit 24 finally determines that an abnormality has occurred when either the first automated driving control unit 32 or the second automated driving control unit 34 has a failure for a predetermined time or longer. The predetermined time is set to, for example, about 1 second to 0.5 seconds, the abnormality detection unit 24 within the predetermined time determines whether there is a failure a plurality of times to determine that an abnormality.

The permission unit 28 receives an operation of turning on/off the automated driving from the driver, and determines the start and end of the automated driving control by using the detection result of the abnormality detection unit 24 to give permission.

The permission unit 28 receives the start instruction of the driver and permits the start of the automated driving control based on the detection result of the abnormality detection unit 24. The permission unit 28 does not permit to start the automated driving control when it is detected that either or both of the first automated driving control unit and the second automated driving control unit are abnormal. The permission unit 28 permits to start the automated driving control when both the first automated driving control unit and the second automated driving control unit are detected to be normal. Thus, only when both the first automated driving control unit 32 and the second automated driving control unit 34 are normal, since the automated driving control is started, the automated driving control can be continued when one becomes abnormal during the automated driving control.

The first switching unit 26 switches which of the first automated driving control unit 32 and the second automated driving control unit 34 performs the automated driving control based on the detection result of the abnormality detection unit 24. The first switching unit 26 switches to the automated driving control of the other of the first automated driving control unit 32 and the second automated driving control unit 34 when one of the first automated driving control unit 32 and the second automated driving control unit 34 that are performing the automated driving control is detected to be abnormal. When switching between the first automated driving control unit 32 and the second automated driving control unit 34 is performed, information indicating continuation of the automated driving control is sent from the permission unit 28 to the second switching unit 38. The permission unit 28 may determine whether the first switching unit 26 switches.

The permission unit 28 instructs the first automated driving control unit and the second automated driving control unit to end the automated driving control. The permission unit 28 instructs the end of the automated driving control, that is, the switching from the automated driving control to the manual driving control, based on the detection result of the abnormality detection unit 24. For example, the permission unit 28 instructs the second switching unit 38 to end the automated driving control when both the first automated driving control unit 32 and the second automated driving control unit 34 become abnormal during the automated driving control.

The second switching unit 38 switches between the automated driving control and the manual driving control in response to an instruction from the permission unit 28. The second switching unit 38 performs a switching process when the end of the automated driving control is determined, and notifies the driver of the end to confirm the hands-on of the driver's steering wheel, the line of sight of the driver, and the like, and switches to the manual driving control.

Incidentally, the permission unit 28 may erroneously transmit an instruction to end the automated driving control to the second switching unit 38. For example, the permission unit 28 may transmit an instruction to end the automated driving control to the second switching unit 38 when the abnormality detection unit 24 detects that there is a failure first, that is, before the abnormality is determined after a predetermined time has elapsed, to the second switching unit 38. In addition, the permission unit 28 may transmit an instruction to end the automated driving control for another reason.

Therefore, the second switching unit 38 determines whether to end the automated driving control on the basis of the detection result of the abnormality detection unit 24 after a predetermined wait time has elapsed when an instruction to end the automated driving control is received from the permission unit 28. The predetermined wait time is set to be equal to or more than a predetermined time from when the abnormality detection unit 24 first detects the defect until when the abnormality is determined. The second switching unit 38 may cause the automated driving control to wait for a predetermined waiting time. Thus, when the permission unit 28 erroneously transmits the end instruction, it is possible to prevent the automated driving control from being ended during the wait time. This wait process will be described with reference to a new drawing.

Figure 2:
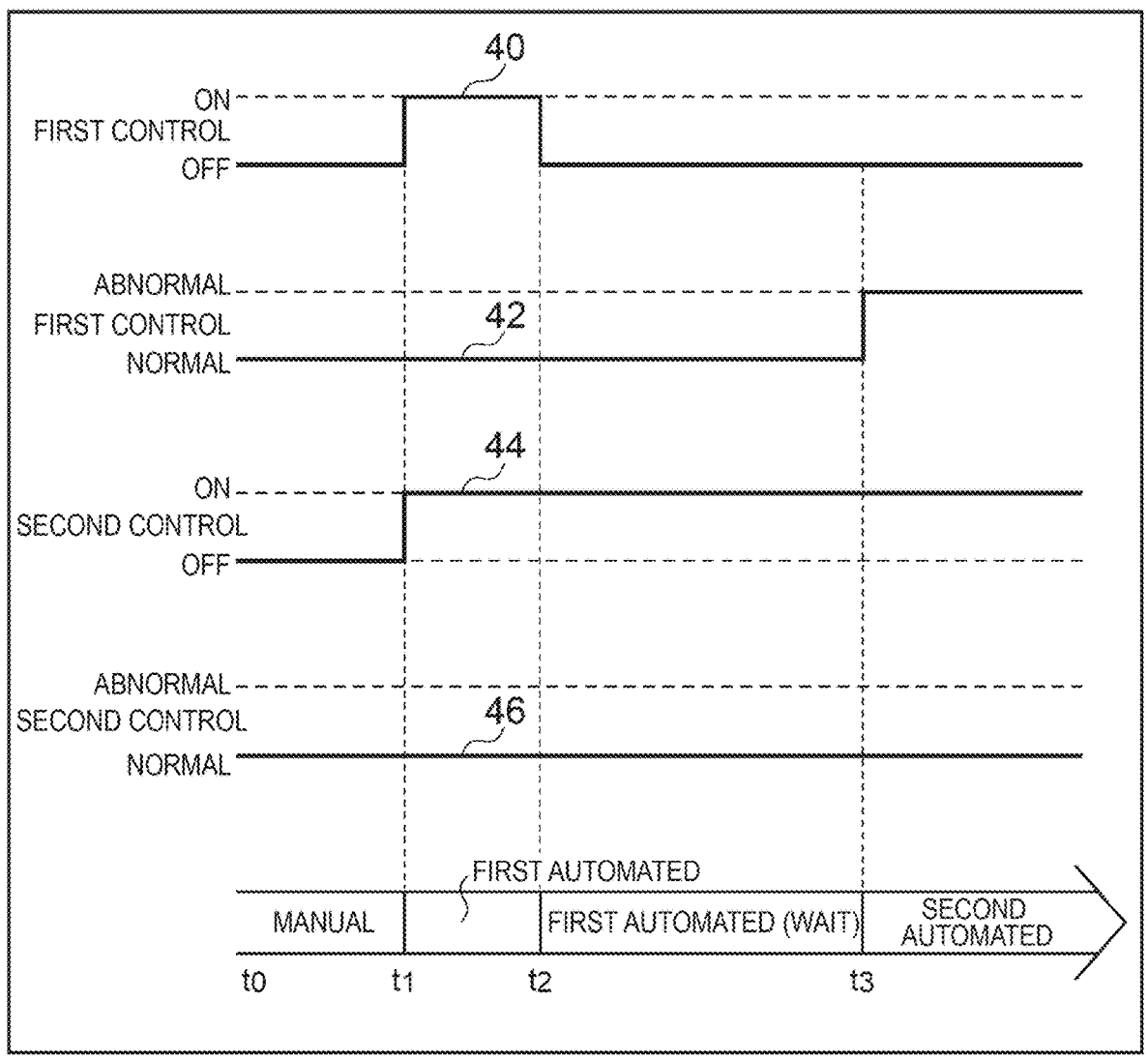
FIG. 2 is a diagram illustrating a wait process during automated driving control.

FIG. 2 is a diagram illustrating a wait process during automated driving control. In FIG. 2, the execution state 40 of the first automated driving control unit 32, the abnormality determination state 42 of the first automated driving control unit 32, the execution state 44 of the second automated driving control unit 34, and the abnormality determination state 46 of the second automated driving control unit 34 are shown in the same time series from the time t0 to the time t3.

In the time t0, manual driving control is being performed. When the driver turns on the automated driving at the time t1, the first automated driving control unit 32 and the second automated driving control unit 34 are both normal, so that the first automated driving control unit 32 turns on and starts the automated driving control. In addition, the second automated driving control unit 34 is also turned on and operates redundantly, although the automated driving control is not directly performed.

At the time t2, the first automated driving control unit 32 is disconnected from the power supply unit, and the first automated driving control unit 32 is turned off. At this time, since the abnormality detection unit 24 cannot determine that the abnormality is abnormal until a predetermined time elapses from the time t2, the abnormality remains normal in the time t2 in which the failure occurs in the first automated driving control unit 32.

At the time t2, even if the permission unit 28 transmits an instruction to end the automated driving control to the second switching unit 38, the second switching unit 38 does not immediately performs the switching process to the manual driving control, and continues the automated driving control by the first automated driving control unit 32 until a predetermined wait time elapses. The waiting time is set to 1 second or less.

At time t3 during waiting, the abnormality detection unit 24 sends the detection result of determining that the first automated driving control unit 32 is abnormal to the first switching unit 26. Since the first automated driving control unit 32 is abnormal, the first switching unit 26 switches from the first automated driving control unit 32 to the driving control of the second automated driving control unit 34, and the permission unit 28 sends information indicating continuation of the automated driving control to the second switching unit 38. Thus, after the time t3, the automated driving control by the second automated driving control unit 34 is continued.

If the second switching unit 38 does not perform the wait processing from the time t2, the switching processing from the time t2 to the manual driving control is performed to switch to the manual driving control. When the anomaly of the first automated driving control unit 32 is determined at the time t3, even if the first switching unit 26 switches the automated driving control, since the permission unit 28 does not permit the starting of the automated driving control, the manual driving control is continued. As described above, if the second switching unit 38 erroneously shifts to the manual driving control without performing the wait process, the automated driving control on the redundant side cannot be performed.

In a case where the second switching unit 38 receives an instruction to end the automated driving control from the permission unit 28, the detection result of the abnormality detection unit 24 may indicate that one of the first automated driving control unit 32 and the second automated driving control unit 34 is abnormal after elapse of a predetermined wait time. In this case, the second switching unit 38 does not end the automated driving control, and the first switching unit 26 receives the detection result of the abnormality detection unit 24 and switches to the automated driving control of the other of the first automated driving control unit 32 and the second automated driving control unit 34. As a result, the second switching unit 38 waits in the automated driving mode without switching to the manual driving mode for a period until the abnormality is determined and the switching control of the first switching unit 26 is performed. Therefore, the first switching unit 26 can continue the automated driving control on the redundant side without erroneously ending the automated driving control. Accordingly, it is possible to prevent sudden switching to manual driving when the vehicle is turning or when the driver does not place his or her hand on the steering wheel.

Return to FIG. 1. When the detection result of the abnormality detection unit 24 after the elapse of the predetermined wait time when the second switching unit 38 receives the end instruction of the automated driving control from the permission unit 28 indicates that the first automated driving control unit 32 and the second automated driving control unit 34 are normal, the second switching unit 38 ends the automated driving control and starts the switching process to the manual driving control to switch to the manual driving control. This is switched to the manual driving control because the permission unit 28 issues an end instruction based on the operation of the driver, rather than the detection result of the abnormality detection unit 24.

When the detection result of the abnormality detection unit 24 after the elapse of the predetermined wait time when the second switching unit 38 receives the instruction to end the automated driving control from the permission unit 28 indicates that both the first automated driving control unit 32 and the second automated driving control unit 34 are abnormal, the second switching unit 38 ends the automated driving control and switches to the manual driving control.

When the predetermined continuation condition is satisfied depending on the traveling state of the vehicle, the first switching unit 26 may switch the automated driving control without passing through the wait process. For example, when the vehicle is turning, the first switching unit 26 may switch to the other one of the first automated driving control unit 32 and the second automated driving control unit 34 before a predetermined time elapses, that is, before an abnormality is determined.

Figure 3:
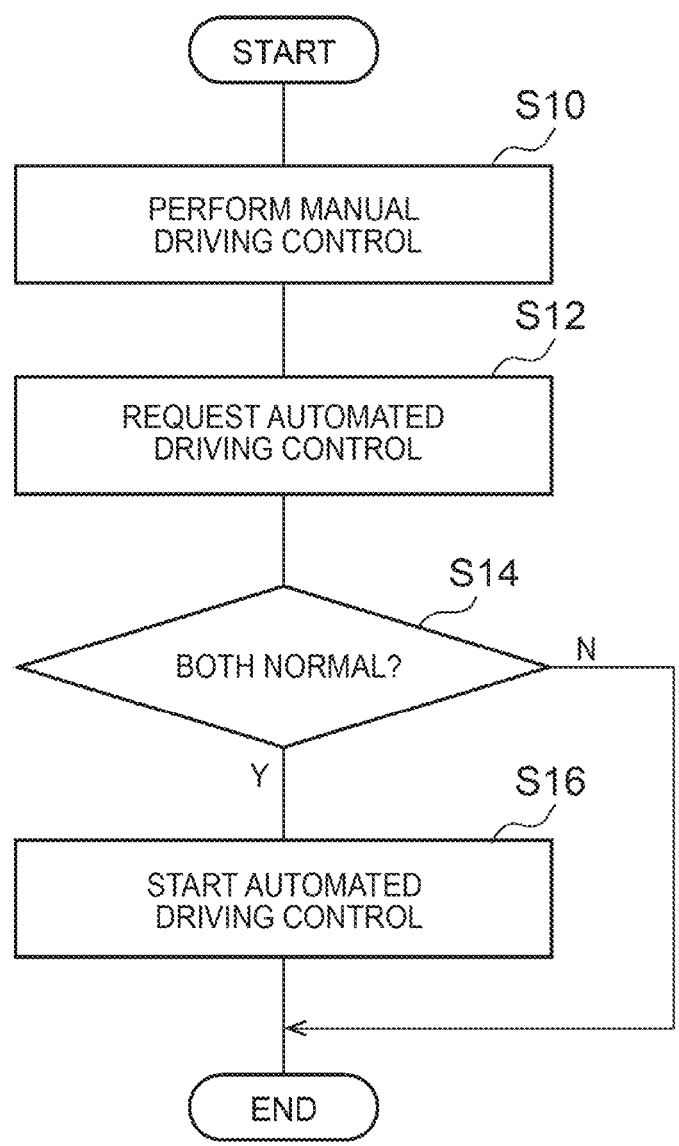
FIG. 3 is a flow chart of a process for starting automated driving control.

FIG. 3 is a flowchart of processing for starting automated driving control. When the manual driving control is being performed (S10), the driver requests the automated driving control (S12). The acquisition unit 20 acquires an input indicating that the driver's automated driving is turned on, and sends the input to the permission unit 28. The permission unit 28 determines whether both the first automated driving control unit 32 and the second automated driving control unit 34 are normal (S14).

If both the first automated driving control unit 32 and the second automated driving control unit 34 are normal (Y in S14), the permission unit 28 permits the start of the automated driving control, and the first automated driving control unit 32 and the second automated driving control unit 34 start the automated driving control (S16). Further, the second switching unit 38 switches from the manual driving control to the automated driving control (S16).

When either or both of the first automated driving control unit 32 and the second automated driving control unit 34 are abnormal (N in S14), the permission unit 28 does not permit the automated driving control to be started, and the process ends. Accordingly, even if one of the first automated driving control unit 32 and the second automated driving control unit 34 becomes abnormal, the automated driving control can be continued on the redundant side.

Figure 4:
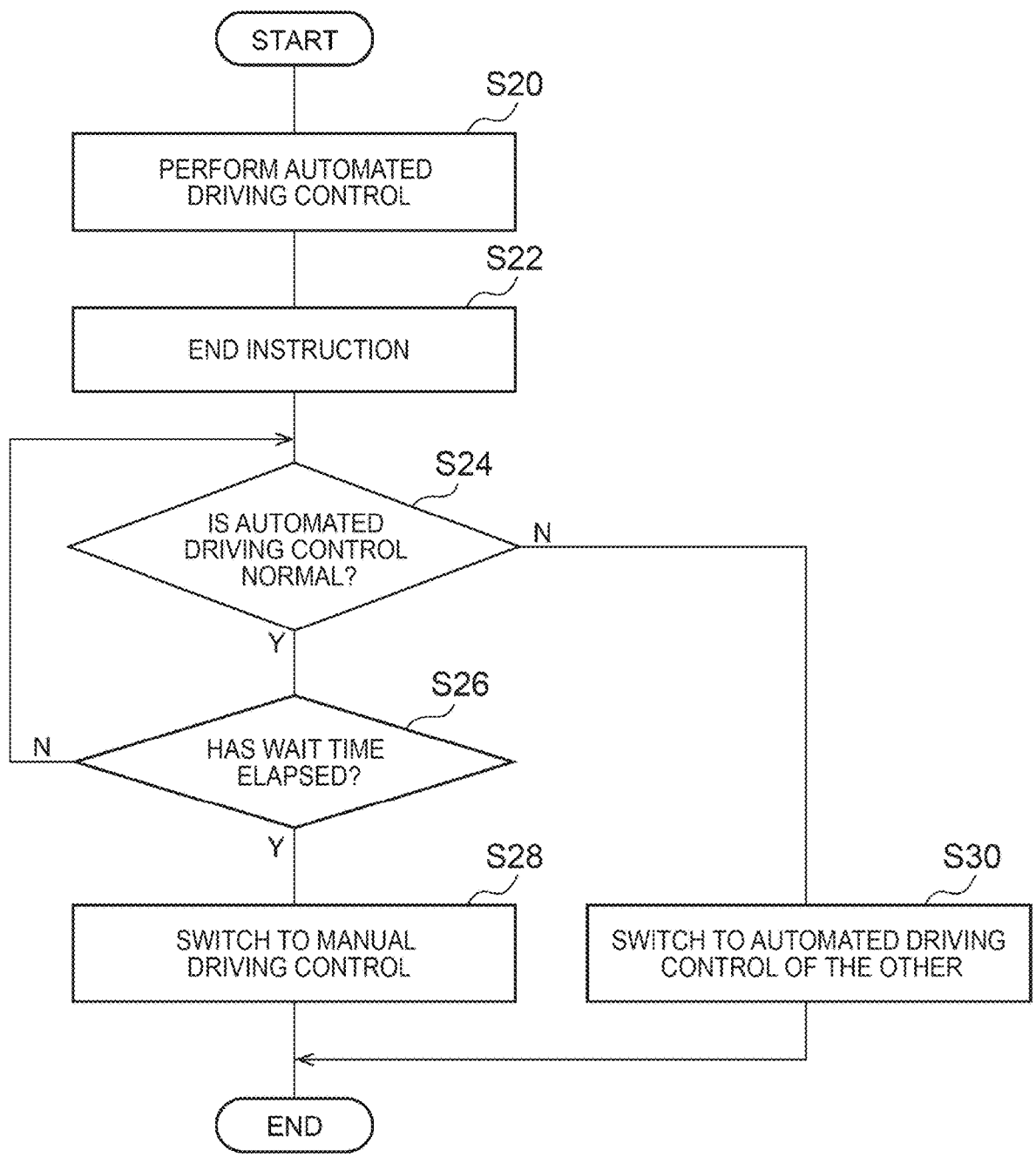
FIG. 4 is a flowchart of processing for ending the automated driving control.

FIG. 4 is a flowchart of processing for ending the automated driving control. The first automated driving control unit 32 or the second automated driving control unit 34 is performing automated driving control (S20). The permission unit 28 sends an instruction to terminate the automated driving control to the second switching unit 38 in response to the driver's input or the detection result of the abnormality detection unit 24 (S22). Note that this termination instruction may have been erroneously transmitted.

The second switching unit 38 determines whether the first automated driving control unit 32 or the second automated driving control unit 34 that is performing the automated driving control is normal (S24). When the first automated driving control unit 32 or the second automated driving control unit 34 that is performing the automated driving control is normal (Y in S24), the second switching unit 38 determines whether a predetermined waiting time has elapsed since the reception of the termination instruction (S26).

If the predetermined wait time has not elapsed (N in S26), the abnormality detection unit 24 repeats the abnormality detection (S24). When the first automated driving control unit 32 and the second automated driving control unit 34 being performed are normal and a predetermined wait time has elapsed (Y in S26), the second switching unit 38 ends the automated driving control, performs the switching process, and switches to the manual driving control (S28). Note that the second switching unit 38 may confirm and switch the hands-on of the driver's eye line and the steering wheel when switching to the manual driving control.

When the first automated driving control unit 32 or the second automated driving control unit 34 being performed is not normal (N in S24), the first switching unit 26 switches to the automated driving control of the redundant-side first automated driving control unit 32 or the second automated driving control unit 34 (S30).

The present disclosure has been described above based on examples. The present disclosure is not limited to the above-described embodiments, and various modifications such as design changes can be made based on knowledge of a person skilled in the art.

What is claimed is:

1. A travel control device, comprising:
   a first automated driving control unit configured to perform automated driving control for autonomously driving a vehicle;
   a second automated driving control unit configured to perform the automated driving control for autonomously driving the vehicle;
   an abnormality detection unit configured to detect an abnormality of the first automated driving control unit and an abnormality of the second automated driving control unit;
   a first switching unit configured to, when one of the first automated driving control unit and the second automated driving control unit that are performing the automated driving control is detected to be abnormal, switch to the automated driving control of another of the first automated driving control unit and the second automated driving control unit;

a permission unit configured to instruct the first automated driving control unit and the second automated driving control unit to end the automated driving control; and a second switching unit configured to switch between the automated driving control and manual driving control in response to an instruction from the permission unit, wherein when the second switching unit receives an instruction to end the automated driving control from the permission unit, the second switching unit waits to end the automated driving control until a predetermined wait time elapses.

2. The travel control device according to claim 1, wherein when the second switching unit receives the instruction to end the automated driving control from the permission unit and a detection result from the abnormality detection unit after elapse of the predetermined wait time indicates that one of the first automated driving control unit and the second automated driving control unit is abnormal, the second switching unit does not end the automated driving control and the first switching unit switches to the automated driving control of another of the first automated driving control unit and the second automated driving control unit.

3. The travel control device according to claim 1, wherein when the second switching unit receives the instruction to end the automated driving control from the permission unit and the detection result from the abnormality detection unit after elapse of the predetermined wait time indicates that both of the first automated driving control unit and the second automated driving control unit are normal, the second switching unit ends the automated driving control and switches to the manual driving control.

4. The travel control device according to claim 1, wherein the permission unit does not permit to start the automated driving control when either or both of the first automated driving control unit and the second automated driving control unit are detected to be abnormal, and permits to start the automated driving control when both the first automated driving control unit and the second automated driving control unit are detected to be normal.

5. A travel control method whose steps are performed by a travel control device, the travel control device including a first automated driving control unit and a second automated driving control unit that are configured to perform automated driving control for autonomously driving a vehicle, the travel control method comprising the steps of:

detecting an abnormality of the first automated driving control unit and an abnormality of the second automated driving control unit;

when only one of the first automated driving control unit and the second automated driving control unit is detected to be abnormal during the automated driving control, switching to the automated driving control of another of the first automated driving control unit and the second automated driving control unit;

instructing the first automated driving control unit and the second automated driving control unit to end the automated driving control; and when an instruction to end the automated driving control is received, waiting to end the automated driving control until a predetermined wait time elapses.

* * * * *